United States Patent
Kwatra et al.

(10) Patent No.: US 11,211,072 B2
(45) Date of Patent: Dec. 28, 2021

(54) PLACING A VOICE RESPONSE SYSTEM INTO A FORCED SLEEP STATE

(71) Applicant: International Business Machines Corporation, Armonk, NY (US)

(72) Inventors: Shikhar Kwatra, Morrisville, NC (US); Adam Lee Griffin, Dubuque, IA (US); Michael Spisak, East Northport, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/749,997

(22) Filed: Jan. 23, 2020

(65) Prior Publication Data
US 2021/0233524 A1   Jul. 29, 2021

(51) Int. Cl.
*G10L 15/22*    (2006.01)
*G10L 15/18*    (2013.01)
*G10L 15/30*    (2013.01)

(52) U.S. Cl.
CPC ......... *G10L 15/22* (2013.01); *G10L 15/1815* (2013.01); *G10L 15/30* (2013.01); *G10L 2015/223* (2013.01); *G10L 2015/228* (2013.01)

(58) Field of Classification Search
CPC .......... G10L 15/22–2015/228; G10L 15/1815; G10L 15/30
See application file for complete search history.

(56) References Cited

U.S. PATENT DOCUMENTS

| | | |
|---|---|---|
| 6,324,499 B1 | 11/2001 | Lewis et al. |
| 6,970,824 B2 | 11/2005 | Hinde et al. |
| 7,069,027 B2 | 6/2006 | Miriyala |
| 7,668,710 B2 | 2/2010 | Doyle |
| 8,311,196 B2 | 11/2012 | Hanson et al. |
| 8,847,881 B2 | 9/2014 | Matsubayashi |
| 9,361,885 B2 | 6/2016 | Ganong, III et al. |
| 10,152,966 B1 | 12/2018 | O'Malley et al. |
| 2008/0089530 A1 | 4/2008 | Bostick et al. |
| 2013/0051543 A1 | 2/2013 | McDysan et al. |

(Continued)

OTHER PUBLICATIONS

CNET, "Howto use Alexa's parental controls", CNET, https://www.cnet.com/how-to/how-to-enable-alexa-parental-controls/, [retrieved Jan. 22, 2020].

*Primary Examiner* — Abul K Azad
(74) *Attorney, Agent, or Firm* — Alexis N. Hatzis (57) ABSTRACT

Embodiments generally relate placing a voice response system into a forced sleep state. In some embodiments, a method includes receiving a voice command from a given user to place a voice response system in a woke state. The method further includes obtaining current context data, and analyzing the current context data using a voice response model trained using a voice response corpus that incorporated a history of interactions and context data by one or more users with the voice response system. The method further includes, from the analysis of the current context data using the voice response model, determining whether the voice response system is to be placed in the woke state; and, responsive to determining that the voice response system is not to be placed in the woke state, placing the voice response system in a sleep state contrary to the voice command.

20 Claims, 5 Drawing Sheets

(56) References Cited

U.S. PATENT DOCUMENTS

2014/0274203 A1* 9/2014 Ganong, III ...... H04W 52/0254
                                                    455/556.1
2014/0372423 A1  12/2014 Majumder et al.
2016/0342379 A1  11/2016 Keipert et al.
2019/0371342 A1* 12/2019 Tukka ............... H04W 52/0254

* cited by examiner

PLACING A VOICE RESPONSE SYSTEM INTO A FORCED SLEEP STATE

BACKGROUND

Artificial intelligence (AI) voice response systems are becoming an enabler for home automation. AI voice response systems are typically always on and can receive voice commands. After receiving a voice command from a user, an AI voice response system provides a voice reply or executes an appropriate action requested by the user. However, in various scenarios, a user may not want an AI voice response system to be activated at all. Even after a voice command is submitted, the user may desire the AI voice response system to resume a standby or dormant mode.

SUMMARY

Disclosed herein is a method for placing a voice response system into a forced sleep state, and a system and a computer program product as specified in the independent claims. Embodiments are given in the dependent claims. Embodiments can be freely combined with each other if they are not mutually exclusive.

In an embodiment, a method includes receiving a voice command from a given user to place a voice response system in a woke state. The method further includes, responsive to receiving the voice command, obtaining current context data. The method further includes analyzing the current context data using a voice response model trained using a voice response corpus that incorporated a history of interactions and context data by one or more users with the voice response system. The method further includes, from the analysis of the current context data using the voice response model, determining whether the voice response system is to be placed in the woke state. The method further includes, responsive to determining that the voice response system is not to be placed in the woke state, placing the voice response system in a sleep state contrary to the voice command.

In another embodiment, the method further includes determining that the voice response system is not to be placed in the woke state, queuing the voice command to be executed when an analysis of future context data using the voice response model determines that the voice response system is to be placed in the woke state. In another aspect, the method further includes: from the analysis of the current context data using the voice response model, determining an alternative command consistent with the current context data; and executing the alternative command. In another aspect, the method further includes determining if there are any restriction policies that restrict how the voice response system responds to voice responses. In another aspect, the method further includes applying a restriction policy, wherein the voice response system is forced into a sleep state if a particular user is studying. In another aspect, the method further includes applying a restriction policy, wherein the voice response system is forced into a sleep state if users are discussing a sensitive topic. In another aspect, the method further includes applying a restriction policy, wherein the voice response system is forced into a sleep state during a predetermined time period.

DETAILED DESCRIPTION

Embodiments described herein facilitate user interactions with a voice response system by placing the voice response system into a forced sleep state in various scenarios and based on learned contextual situations, even if a voice command is submitted with a general wakeup command.

In an embodiment, a system receives a voice command from a given user to place a voice response system in a woke state. Responsive to receiving the voice command, the system obtains current context data, and analyzes the current context data using a voice response model trained using a voice response corpus that incorporated a history of interactions and context data by one or more users with the voice response system. From the analysis of the current context data using the voice response model, the system determines whether the voice response system is to be placed into the woke state. Responsive to determining that the voice response system is not to be placed into the woke state, the system places the voice response system into a sleep state contrary to the voice command.

Figure 1:
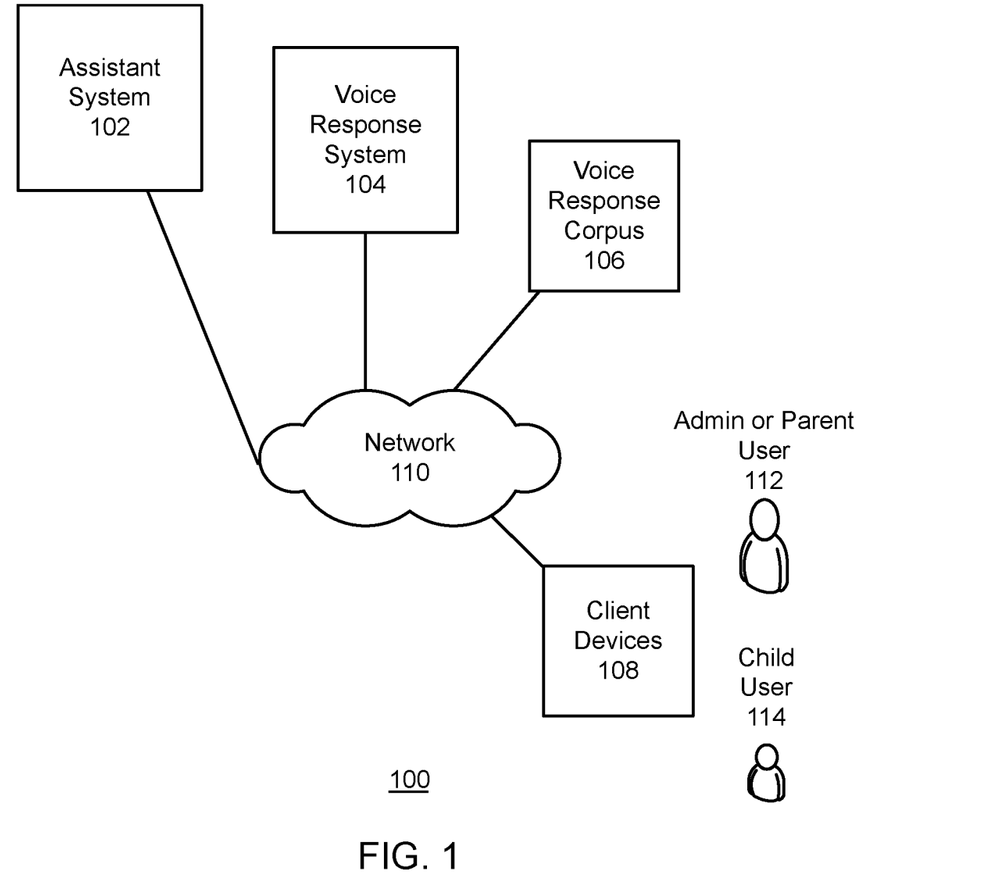
FIG. 1 is a block diagram of an example environment for placing a voice response system into a forced sleep state, which may be used for some implementations described herein.

FIG. 1 is a block diagram of an example environment 100 for placing a voice response system into a forced sleep state, which may be used for some implementations described herein. In some implementations, environment 100 includes an assistant system 102, a voice response system 104, a voice response corpus 106, client devices 108, and a network 110. In various embodiments, assistant system 102, voice response system 104, a voice response corpus 106, and client devices 108 communicate via network 110. Network 110 may be any suitable communication network such as a Wi-Fi network, Bluetooth network, the Internet, etc., or combination thereof.

As described in more detail herein, assistant system 102 enables voice response system 104 to receive data including voice commands and contextual inputs from various client devices 108. Assistant system 102 also enables voice response system 104 to send output responses including response outputs and voice responses to client devices 108. Client devices 108 enable users such as an admin or parent user 112 and/or child user 114 to communicate with assistant system 102 and/or voice response system 104.

Client devices 108 may include microphones, cameras, smart personal devices, wearable devices, virtual assistants, smart appliances, etc. These types of client devices may input information including voice commands to assistant system 102 and/or voice response system 102. These types of client devices may also output information including voice responses from assistant system 102 and/or voice response system 104.

As described in more detail herein, in various embodiments, client devices 108 collect various contextual information associated with user activities. The contextual information may include history of interactions and context data.

The history of interactions may include interaction information of users, and the context data may include behavior information of users. For example, contextual information may include conversations between users, voice requests, studying activities, times of these user activities, etc. The contextual information may include actual conversations and requests (e.g., words spoken by users).

Client devices 108 send the contextual information to assistant system 102 and/or voice response system 104. Such contextual information may be referred to as contextual inputs, as they are inputted into assistant system 102 and/or voice response system 104. Assistant system 102 may send to and store the contextual information at voice response corpus 106. In various embodiments, system 102 may utilize a machine-learning corpus, including various techniques found in deep convolutional neural networks (DCNNs). System 102 may receive input data that is inputted through a DCNN with multiple input streams (e.g., audio input, video input, etc.).

In various embodiments, assistant system 102 analyzes the contextual information to determine whether to respond to or to ignore voice commands from a given user. Assistant system 102 makes such determinations based on the contextual information. For example, in some scenarios, assistant system 102 may cause voice response system 104 to ignore a given voice command based on the contextual information, even if the voice command is a general wakeup command. Further embodiments directed to determining whether to respond to or to ignore voice commands from a given user are described in more detail herein.

For ease of illustration, FIG. 1 shows one block for each of assistant system 102, voice response system 104, voice response corpus 106, client devices 108, and network 110. Blocks 102, 104, 106, 108, and 110 may represent multiple assistant systems, voice response systems, voice response corpuses, client devices, and networks. Also, there may be any number of users. In other implementations, environment 100 may not have all of the components shown and/or may have other elements including other types of elements instead of, or in addition to, those shown herein.

While assistant system 102 performs embodiments described herein, in other embodiments, any suitable component or combination of components associated with assistant system 102 or any suitable processor or processors associated with assistant system 102 may facilitate performing the embodiments described herein. In various embodiments, assistant system 102 and voice response system 104 may perform implementations described herein individually, together, or in combination with other devices. For example, in some embodiments, assistant system 102 may cause voice response system 104 to perform some actions described herein on behalf of assistant system 102.

Figure 2:
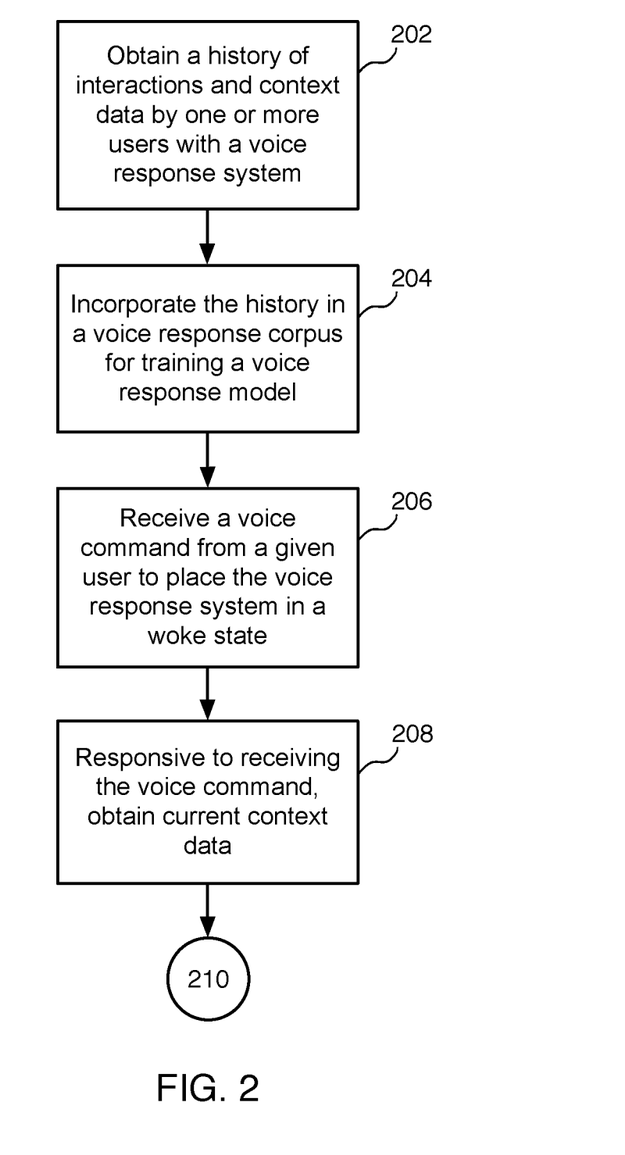
FIG. 2 is an example flow diagram for placing a voice response system into a forced sleep state, according to some embodiments.

FIG. 2 is an example flow diagram for placing a voice response system into a forced sleep state, according to some embodiments. As described in more detail herein, assistant system 102 analyzes the contextual information to determine whether to respond to or to ignore voice commands from a given user. In various embodiments, assistant system 102 causes voice response system 104 to remain or go into a woke state and respond to voice commands. Alternatively, in various embodiments, assistant system 102 causes voice response system 104 to remain or go into a sleep state and not respond to voice commands. The terms sleep mode, sleep state, dormant mode, and dormant state may be used interchangeably. Also, the terms woke mode, woke state, awake mode, awake state, active mode, and active state may be used interchangeably.

Referring to both FIGS. 1 and 2, a method begins at block 202, where a system such as assistant system 102 obtains a history of interactions and context data by one or more users with a voice response system. The terms assistant system 102 and system 102 may be used interchangeably. For example, the history of interactions may include past voice requests that the system has received over time. The context data may include various information associated with each voice command. For example, such information may include each actual voice command, the identity of each user who made each voice command, the time of each voice command, etc.

At block 204, assistant system 102 incorporates the history of interactions in a voice response corpus for training a voice response model. For example, assistant system 102 may store the history of interactions, as well as any associated context data in voice response corpus 106 of FIG. 1. The training of the voice response model may be performed using any suitable training techniques. In various embodiments, iterative learning feedback is inculcated in the voice response model taking into account that user heuristics build confidence in the model.

In various embodiments, the voice response corpus may include policies that govern various scenarios where voice response system 104 should remain or go into a sleep state and not respond to voice commands from a particular user.

In an example scenario, a parent may have a rule such as "no technology interruptions or distractions during study time." The context data may describe a contextually identified study time, where the system should not respond if a child wants to engage the system while studying. For example, the child may want to engage the system and become distracted from studying. In another example, the child may be studying a subject such as math and engage the system to answer math questions for the child. Such a policy for the system to remain in a sleep state would prevent this.

At block 206, assistant system 102 receives a voice command from a given user to place voice response system 104 in a woke state. In various embodiments, a woke state may refer to an awake state or active state, where the system may respond to voice commands. As such, if the system is in a dormant or sleep state, a voice command may be any command directed at the system. For example, a user may ask the system the time of day or to set an alarm, etc. In the example above involving a child engaging the system while studying, the system may receive a voice command to answer a particular math problem (e.g., "What is 144 divided by 12?"). In some embodiments, system 102 may detect a voice of a given user and render the voice of the user as a general voice command for voice response system 104 to go into a woke state.

At block 208, responsive to receiving the voice command, assistant system 102 obtains current context data. The current context data may include the current activity of the user. For example, the user may be sitting in the living room reading a book, watching television, eating, studying, etc. The current context data may include the location of the user while submitting voice command, predicted activity of the user, the topic, etc. In various embodiments, the system may obtain the current context data using client devices 108. As indicated above, client devices 108 may include microphones, cameras, smart devices that collect the current context data.

Figure 3:
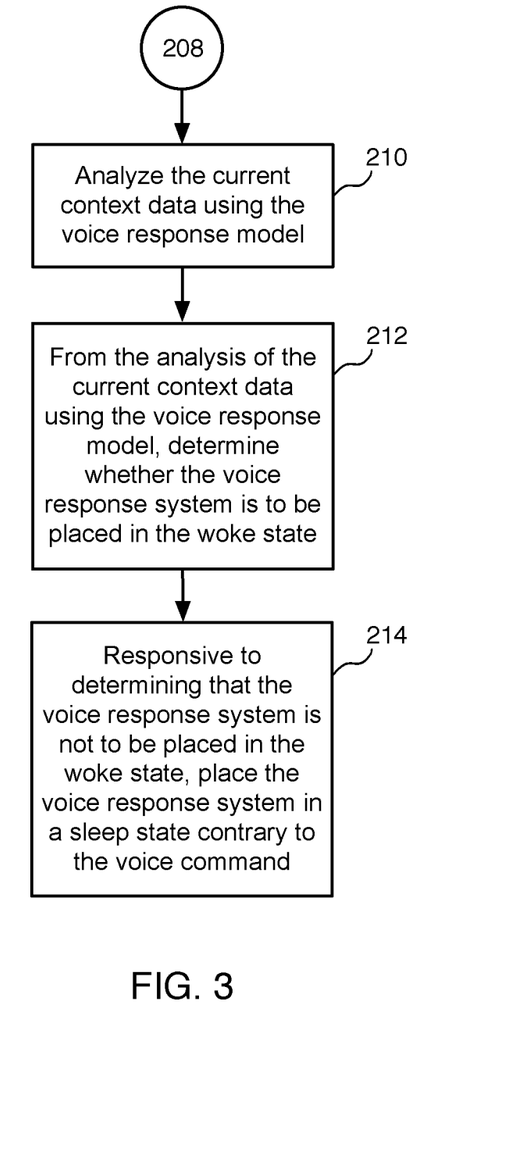
FIG. 3 is an example flow diagram for placing a voice response system into a forced sleep state, continuing from FIG. 2, according to some embodiments.

FIG. 3 is an example flow diagram for placing a voice response system into a forced sleep state, continuing from FIG. 2, according to some embodiments. Referring to FIGS. 1, 2, and 3, at block 210, assistant system 102 analyzes the current context data using the voice response model. In some embodiments, system 102 may determine if there are any restriction policies that restrict how voice response system 104 responds to voice responses. For example, a policy may be for the system to ignore the voice command if the user is studying, so as to not distract the user.

In some implementations, assistant system 102 may apply a restriction policy, where the voice response system is forced into a sleep state if a particular user is studying. In the example above involving a child engaging the system while studying, the system may obtain current context data from contextual inputs provided by client devices 108 of FIG. 1. For example, the system may detect that a child is studying based on various different character attributes. The system may determine such character attributes from contextual inputs from client devices 108. For example, a microphone may capture the words, "I'm going to study," "Bobby, start studying now," etc. A video camera may capture the child sitting still at a table with a book. The system may also detect the thickness of a book being read by the child, page-flip rates, supporting materials, etc. The system may receive and process such current context data to determine that the child is studying. In various embodiments, in addition to detecting user activities and objects, the system may also detect user sentiment. For example, the system may determine mannerisms of the user, including signs of frustration (e.g., a palm on the forehead, etc.), signs of concentration (e.g., reading a book, etc.).

These visual queues help the system to differentiate the activity of studying versus non-studying. For example, when not studying, the system may detect periods in time when the child is coloring in a color book. This may be determined by identifying a coloring book and/or by capturing hand motions correlating to coloring, etc. In various embodiments, the system may learn such differentiation based on character attributes of each user.

As indicated above, in various embodiments, such restriction policies may be stored in voice response corpus 104. In some embodiments, the system may analyze the current context data using a region-based convolutional neural network (R-CNN) and/or a bi-directional long short-term memory (Bi-LSTM) model in order to determine whether to provide a voice response.

At block 212, from the analysis of the current context data using the voice response model, assistant system 102 determines whether voice response system 104 is to be placed in the woke state. For example, if no particular policy restricts the system from responding based on the current context data, the system may then go into the woke state and respond as usual.

At block 214, responsive to determining that voice response system 102 is not to be placed in the woke state, assistant system 102 places voice response system 104 in a sleep state contrary to the voice command. In the example above involving a child engaging voice response system 104 while studying, assistant system 102 may determine that voice response system 104 should go into a sleep state contrary to the voice command. As such, voice response system 104 ignores the voice command.

If a particular policy restricts the system from responding based on the current context data, assistant system 102 may force voice response system 104 to go into the sleep state and not respond as usual. While some implementations are described in the context of math as the study subject, embodiments may apply to other topics, and will depend on the particular implementation. For example, a particular constraint policy may apply to any topic (e.g., history, language, science, etc.).

In various scenarios, voice response system 104 goes in the sleep state even if user submitted the voice command by mistake or intentionally. In various embodiments, if voice response system 104 goes into a sleep state, assistant system 102 queues the voice command to be executed when an analysis of future context data using the voice response model determines that the voice response system is to be placed in the woke state.

In various embodiments, responsive to determining that the voice response system is not to be placed in the woke state, assistant system 102 may queue the voice command to be executed when an analysis of future context data using the voice response model determines that voice response system 104 is to be placed in the woke state.

In various embodiments, assistant system 102 determines an alternative command consistent with the current context data based on the analysis of the current context data using the voice response model. For example, if the user is studying math and the system is not permitted to answer math questions, assistant system 102 may still allow voice response system 104 to respond to alternative commands such as providing the time of day, which would not distract the user from studying. Assistant system 102 then executes the alternative command (e.g., providing the time of day, etc.).

Following are other example embodiments involving restriction policies where assistant system 102 forces voice response system 104 into a sleep state so that voice response system 104 does not respond to voice commands.

In some implementations, assistant system 102 may apply a restriction policy, where voice response system 104 is forced into a sleep state if users are discussing a sensitive topic. In an example scenario, a husband and wife may be discussing sensitive subject matters such as finances, taxes, medical conditions, social security numbers, etc. In various embodiments, system 102 prevents voice response system 104 from eavesdropping on these types of conversations.

In this example scenario, assistant system 102 obtains a history of interactions and context data by one or more users with a voice response system and incorporates the history in a voice response corpus for training a voice response model, as described above in connection with FIG. 2. In some embodiments, assistant system 102 may detect voices of users in a conversation and may render the voices as a general voice command for voice response system 104 to go into a woke state. In response, system 102 obtains and analyzes current context data. From the analysis of the current context data using the voice response model, system 102 determines whether the voice response system is to be placed in the woke state. In this scenario, system 102 detects that the users are discussing a sensitive topic involving personal, private, or confidential information. As such, system 102 determines that the voice response system is not to be placed in the woke state but is to instead be placed in a sleep state. System 102 then places the voice response system in a sleep state contrary to the voice command.

In some implementations, assistant system 102 may apply a restriction policy, where voice response system 104 is forced into a sleep state during a predetermined time period. In an example scenario, a parent may have a rule such as "no technology interruptions or distractions during dinner time." However, the actual time of dinner may vary each day based on the parents' work schedules. In various embodiments, the system may detect when the family sits down for dinner on different days. The system may then generate an identifiable pattern of contextual behavior to determine when to go into a force sleep mode.

In this example scenario, assistant system 102 obtains a history of interactions and context data by one or more users with a voice response system and incorporates the history in a voice response corpus for training a voice response model, as described above in connection with FIG. 2. In some embodiments, assistant system 102 may detect voices of users in a conversation at dinner and may render the voices as a general voice command for voice response system 104 to go into a woke state. In response, system 102 obtains and analyzes current context data. From the analysis of the current context data using the voice response model, system 102 determines whether the voice response system is to be placed in the woke state. In this scenario, system 102 detects that it is dinner time. In various embodiments, system 102 may determine that it is dinner time based information from voice response corpus 106. For example, such information may include a time range (e.g., 6:00 p.m. to 7:00 p.m.), words indicating dinner time (e.g., "Dinner is ready," "Bon appétit," etc.). System 102 may also determine that the users are at the dinner table. As such, system 102 determines that the voice response system is not to be placed in the woke state but is to instead be placed in a sleep state. System 102 then places voice response system 104 into a sleep state contrary to the voice command.

While the previous example involves dinner time, embodiments may also apply to other mealtimes such as breakfast, lunch, etc., or even other times. For example, system 102 may force voice response system 104 to go into a sleep state during bedtime of a given user. In an example scenario involving bedtime, assistant system 102 obtains a history of interactions and context data by one or more users with a voice response system and incorporates the history in a voice response corpus for training a voice response model, as described above in connection with FIG. 2. In some embodiments, assistant system 102 may detect the voice of a given user at bedtime, and may render the voice as a general voice command for voice response system 104 to go into a woke state. In response, system 102 obtains and analyzes current context data. From the analysis of the current context data using the voice response model, system 102 determines whether the voice response system is to be placed in the woke state. In this scenario, system 102 detects that it is bedtime. In various embodiments, system 102 may determine that it is bedtime based on information from voice response corpus 106. For example, such information may include a time range (e.g., 8:30 p.m. to 9:00 p.m.), words indicating bedtime (e.g., "Time for bed," "Good night," etc.). System 102 may also determine that the user is in bed. As such, system 102 determines that the voice response system is not to be placed in the woke state but is to instead be placed in a sleep state. System 102 then places the voice response system in a sleep state contrary to the voice command. As indicated herein, system 102 may determine alternative commands consistent with the current context data based on the analysis of the current context data using the voice response model. For example, the AI voice response system may execute a command to play music while the given user goes to bed, but may play relaxing music as opposed to lively music.

While previous example involves predetermined times, embodiments may also apply to other scenarios during various times. For example, assistant system 102 may force voice response system 104 to go into a sleep state if assistant system 102 identifies that a first user in the area is busy and that providing a voice response for a second user might create disturbance to the first user. The analysis module may make such a determination based on analyzing the topic that the first user is studying, priority, etc. In such scenarios, where the system remains in a sleep state, assistant system 102 may store and queue requests (or responses) for a later, more appropriate time based on the requested subject matter.

As indicated herein, in various embodiments, assistant system 102 may analyze various context data provided by client devices 108, where the context data may include historical interactions associated with various users. Assistant system 102 may also analyze various other types of context data, including interruption-related interactions, environmental-related interactions, etc. The following are example embodiments.

In some embodiments, assistant system 102 may receive cancellations of voice requests, where a user asks assistant system 102 to stop before providing a voice response, or interrupts assistant system 102 to stop while providing a voice response. Assistant system 102 may receive post-cancellation commands of particular content (e.g., "Do not provide answers to math questions during study time," "Go to sleep during dinner time," etc.). Assistant system 102 may receive information on what user is submitting a voice request, what user or users are present during the voice request, what user or users overrides any voice responses. Assistant system 102 may receive hierarchical commands or authorizations. Assistant system 102 may receive parental/content control settings and/or history. Assistant system 102 may receive timing information as to when a voice command is submitted. Assistant system 102 may determine and/or receive topic/subject information as to what topic/subject matter is involved in a given voice command. Assistant system 102 may receive location information as to the location of a given voice command. Assistant system 102 may receive calendar and time-based scenarios. Assistant system 102 may determine user behavior information as to distraction patterns of one or more users. Assistant system 102 may determine activity information as to what activities one or more user are performing. Assistant system 102 may determine sound information associated with ambient noise patterns. Assistant system 102 may determine sentiment information as to tone of voice and mannerisms. Assistant system 102 may determine the types of questions that a given user asks voice response system 104.

In some embodiments, assistant system 102 may utilize a machine learning module to analyze and gather various scenarios when user interrupts the response of voice response system. This may include the user asking the system to stop, pause etc. In some embodiments, the system may also collect information as to when a user submits an incomplete voice request to the AI voice response system. In some embodiments, during an interruption of the user providing a voice request and/or any interruption of the system providing a voice response, the system may communicate with the user using surrounding cameras, Internet of things (IoT) sensors, biometric data, etc. In some embodiments, the system may utilize a context-enabled Bi-LSTM module to process data in order to find various scenarios when the user does not complete a voice request and/or when the user interrupts a voice response from the system.

In some embodiments, the system may utilize a reinforcement learning module and/or a feedback learning module to take into account weights applied on feature inputs. Such weights may be pre-configured or may be configured on the fly. In some embodiments, the system may collect user satisfaction information based on an emotion analyzer application programming interface (API). In some embodiments, the system may perform principal component analysis for dimensionality reduction or feature pruning in order to accurately and quickly configure the weights associated with the feature inputs.

In some embodiments, assistant system 102 may identify context data based on surrounding visual context data and infusing spoken content data with bag-of-words techniques. In some embodiments, assistant system 102 may convert multimedia streaming data into a buffer stream of arrayed images, which are split between a training set and a test set. In some embodiments, assistant system 102 may employ region-based convolutional neural network (R-CNN) techniques with a neural-network library and with variation image pre-processing and accuracy refinement parameters (e.g., layers, train-test split, epochs, etc.) in order to enhance/augment the classification of user activity with crowdsourced data.

Figure 4:
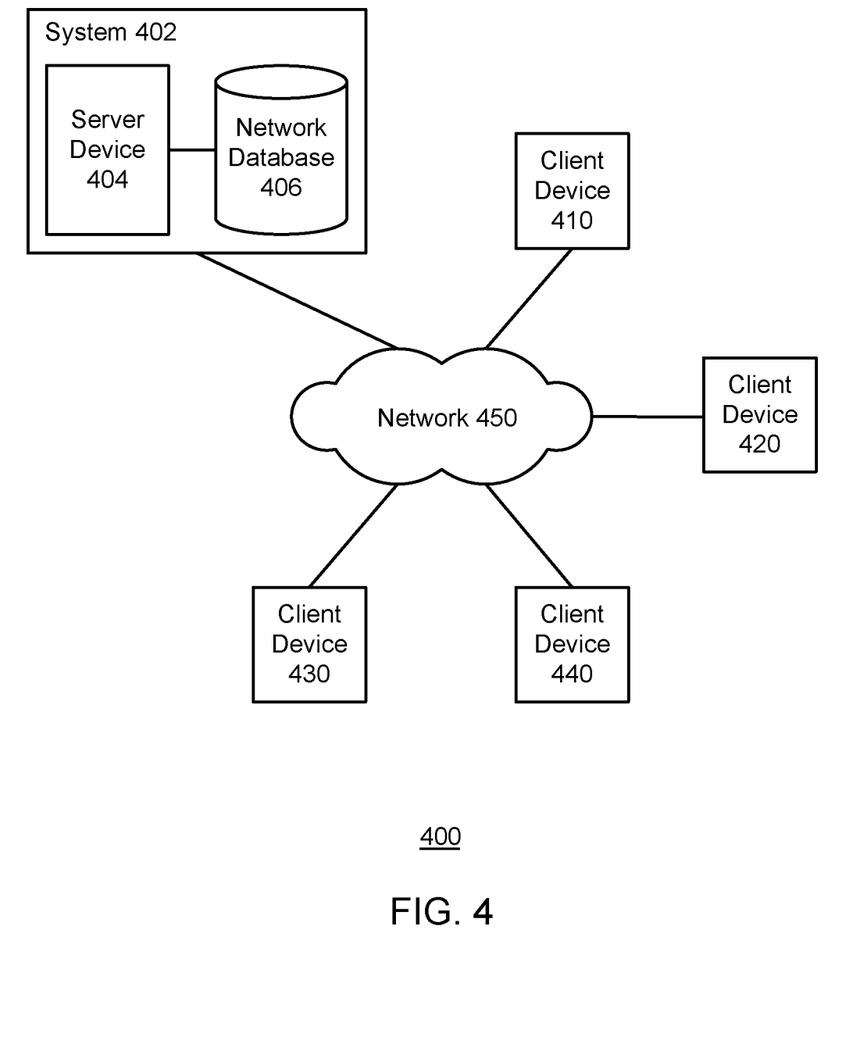
FIG. 4 is a block diagram of an example network environment for placing a voice response system into a forced sleep state, which may be used for some implementations described herein.

FIG. 4 is a block diagram of an example network environment 400 for placing a voice response system into a forced sleep state, which may be used for some implementations described herein. In some implementations, network environment 400 includes a system 402, which includes a server device 404 and a database 406. Network environment 400 also includes client devices 410, 420, 430, and 440, which may communicate with system 402 and/or may communicate with each other directly or via system 402. Network environment 400 also includes a network 450 through which system 402 and client devices 410, 420, 430, and 440 communicate. Network 450 may be any suitable communication network such as a Wi-Fi network, Bluetooth network, the Internet, etc.

In various embodiments, system 402 may be used to implement voice response system 102 of FIG. 1, as well as to perform embodiments described herein. Database 406 may be used to implement voice response corpus 104 of FIG. 1. Client devices 410, 420, 430, and 440 may be used to implement various contextual inputs 106 of FIG. 1.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server 404 of system 402 performs embodiments described herein, in other embodiments, any suitable component or combination of components associated with server 402 or any suitable processor or processors associated with server 402 may facilitate performing the embodiments described herein.

Figure 5:
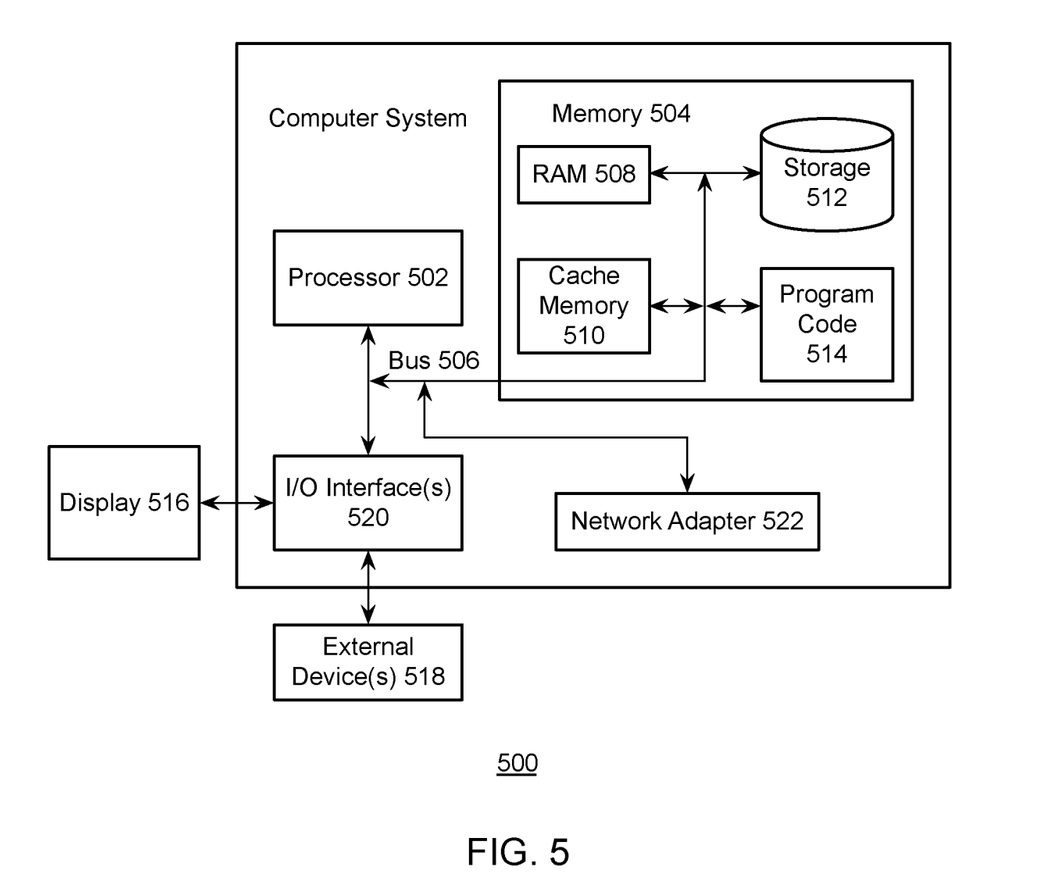
FIG. 5 is a block diagram of an example computer system, which may be used for embodiments described herein.

FIG. 5 is a block diagram of an example computer system 500, which may be used for embodiments described herein. For example, computer system 500 may be used to implement voice response system 102 of FIG. 1 or server device 404 of FIG. 4, as well as to perform embodiments described herein. Computer system 500 is operationally coupled to one or more processing units such as processor 502, a memory 504, and a bus 506 that couples to various system components, including processor 502 and memory 504. Bus 506 represents one or more of any of several types of bus structures, including a memory bus, a memory controller, a peripheral bus, an accelerated graphics port, a processor or local bus using any of a variety of bus architectures, etc. Memory 504 may include computer readable media in the form of volatile memory, such as a random access memory (RAM) 508, a cache memory 510, and a storage unit 512, which may include non-volatile storage media or other types of memory. Memory 504 may include at least one program product having a set of at least one program code module such as program code 514 that are configured to carry out the functions of embodiments described herein when executed by processor 502. Computer system 500 may also communicate with a display 516 or one or more other external devices 518 via input/output (I/O) interface(s) 520. Computer system 500 may also communicate with one or more networks via network adapter 522. In other implementations, computer system 500 may not have all of the components shown and/or may have other elements including other types of elements instead of, or in addition to, those shown herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   receiving a voice command from a given user to place a voice response system in a woke state;
   responsive to receiving the voice command, obtaining current context data;
   analyzing the current context data using a voice response model trained using a voice response corpus that incorporated a history of interactions and context data by one or more users with the voice response system;
   from the analysis of the current context data using the voice response model, determining whether the voice response system is to be placed in the woke state; and
   responsive to determining that the voice response system is not to be placed in the woke state, placing the voice response system in a sleep state contrary to the voice command.

2. The system of claim 1, wherein the at least one processor further performs operations comprising, responsive to determining that the voice response system is not to be placed in the woke state, queuing the voice command to be executed when an analysis of future context data using the voice response model determines that the voice response system is to be placed in the woke state.

3. The system of claim 1, wherein the at least one processor further performs operations comprising:
   from the analysis of the current context data using the voice response model, determining an alternative command consistent with the current context data; and
   executing the alternative command.

4. The system of claim 1, wherein the at least one processor further performs operations comprising determining if there are any restriction policies that restrict how the voice response system responds to voice responses.

5. The system of claim 1, wherein the at least one processor further performs operations comprising applying a restriction policy, wherein the voice response system is forced into a sleep state if a particular user is studying.

6. The system of claim 1, wherein the at least one processor further performs operations comprising applying a restriction policy, wherein the voice response system is forced into a sleep state if users are discussing a sensitive topic.

7. The system of claim 1, wherein the at least one processor further performs operations comprising applying a restriction policy, wherein the voice response system is forced into a sleep state during a predetermined time period.

8. A computer program product comprising a computer readable storage medium having program instructions embodied therewith, the program instructions executable by at least one processor to cause the at least one processor to perform operations comprising:
   receiving a voice command from a given user to place a voice response system in a woke state;
   responsive to receiving the voice command, obtaining current context data;
   analyzing the current context data using a voice response model trained using a voice response corpus that incorporated a history of interactions and context data by one or more users with the voice response system;
   from the analysis of the current context data using the voice response model, determining whether the voice response system is to be placed in the woke state; and
   responsive to determining that the voice response system is not to be placed in the woke state, placing the voice response system in a sleep state contrary to the voice command.

9. The computer program product of claim 8, wherein the at least one processor further performs operations comprising responsive to determining that the voice response system is not to be placed in the woke state, queuing the voice command to be executed when an analysis of future context data using the voice response model determines that the voice response system is to be placed in the woke state.

10. The computer program product of claim 8, wherein the at least one processor further performs operations comprising:
   from the analysis of the current context data using the voice response model, determining an alternative command consistent with the current context data; and
   executing the alternative command.

11. The computer program product of claim 8, wherein the at least one processor further performs operations comprising determining if there are any restriction policies that restrict how the voice response system responds to voice responses.

12. The computer program product of claim 8, wherein the at least one processor further performs operations comprising applying a restriction policy, wherein the voice response system is forced into a sleep state if a particular user is studying.

13. The computer program product of claim 8, wherein the at least one processor further performs operations comprising applying a restriction policy, wherein the voice response system is forced into a sleep state if users are discussing a sensitive topic.

14. The computer program product of claim 8, wherein the at least one processor further performs operations comprising applying a restriction policy, wherein the voice response system is forced into a sleep state during a predetermined time period.

15. A computer-implemented method for placing a voice response system into a forced sleep state, the method comprising:
   receiving a voice command from a given user to place a voice response system in a woke state;
   responsive to receiving the voice command, obtaining current context data;
   analyzing the current context data using a voice response model trained using a voice response corpus that incorporated a history of interactions and context data by one or more users with the voice response system;
   from the analysis of the current context data using the voice response model, determining whether the voice response system is to be placed in the woke state; and
   responsive to determining that the voice response system is not to be placed in the woke state, placing the voice response system in a sleep state contrary to the voice command.

16. The method of claim 15, further comprising responsive to determining that the voice response system is not to be placed in the woke state, queuing the voice command to be executed when an analysis of future context data using the voice response model determines that the voice response system is to be placed in the woke state.

17. The method of claim 15, further comprising:
   from the analysis of the current context data using the voice response model, determining an alternative command consistent with the current context data; and
   executing the alternative command.

18. The method of claim 15, further comprising determining if there are any restriction policies that restrict how the voice response system responds to voice responses.

19. The method of claim 15, further comprising applying a restriction policy, wherein the voice response system is forced into a sleep state if a particular user is studying.

20. The method of claim 15, further comprising applying a restriction policy, wherein the voice response system is forced into a sleep state if users are discussing a sensitive topic.

* * * * *